July 4, 1961 H. L. SWEENEY ET AL 2,990,564
GRILL CLEANER
Filed March 28, 1960
2 Sheets-Sheet 1
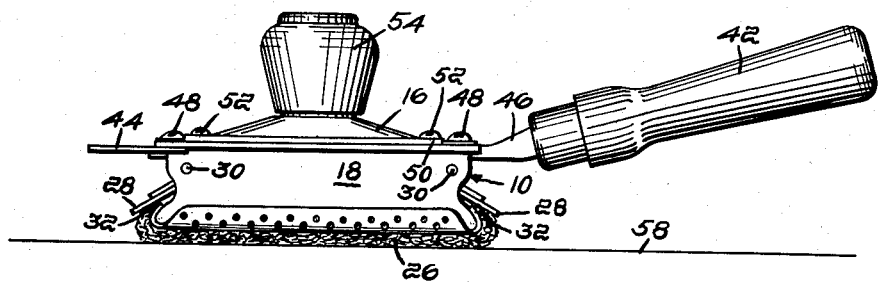
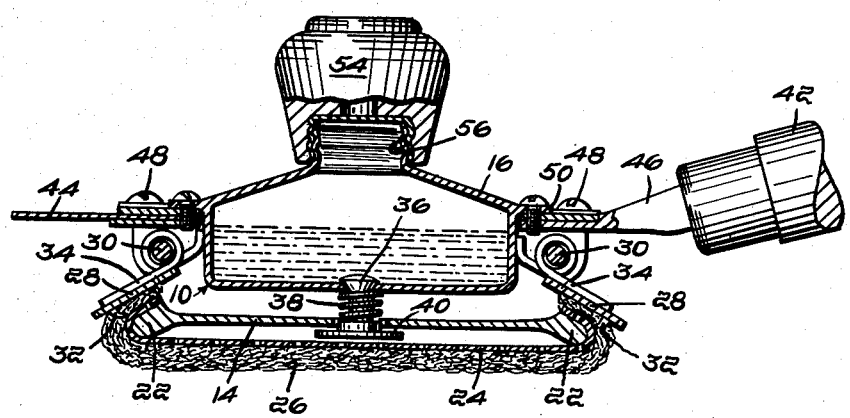
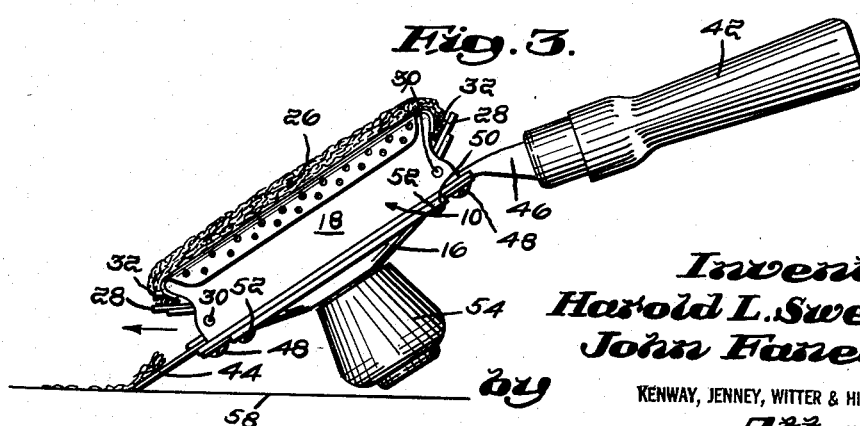
Inventors:
Harold L. Sweeney,
John Faneros,
by KENWAY, JENNEY, WITTER & HILDRETH
Attorneys

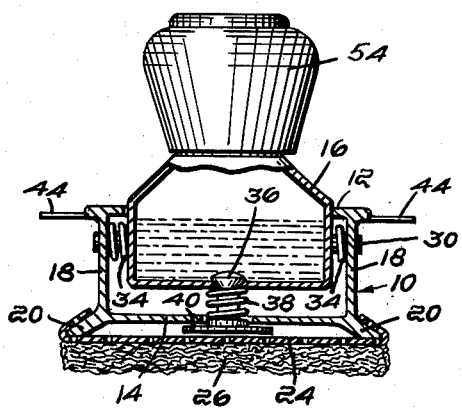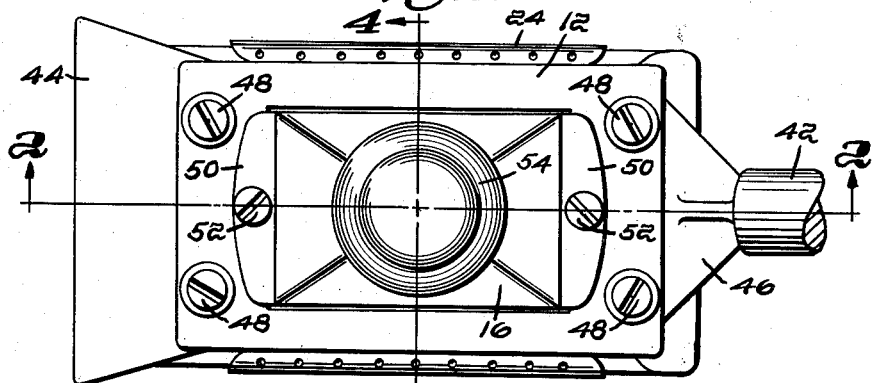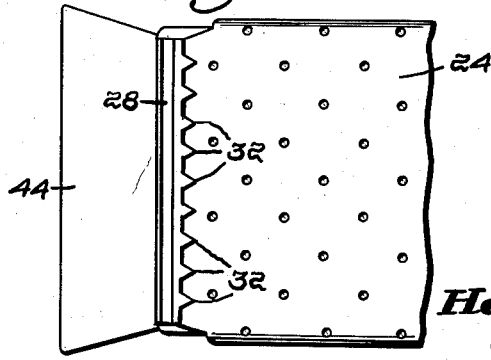

United States Patent Office 2,990,564
Patented July 4, 1961

---

2,990,564
GRILL CLEANER
Harold L. Sweeney, 8 Jackson Court, Natick, Mass., and John Faneros, 415 Textile Ave., Dracut, Mass.
Filed Mar. 28, 1960, Ser. No. 18,159
7 Claims. (Cl. 15—569)

This invention relates to a novel and improved device for cleaning the flat heated plate of cooking grills. These plates are kept hot for long periods of time and used continuously for cooking or heating various foods including hamburg patties, frankfurters, rolls, onions, etc., and frequent and reasonably thorough cleaning is necessary to maintain sanitary conditions and produce satisfactory and untainted prepared food products. The continuous heating of the plate together with the contact of the various foods results in the forming of heated food particles and food odors on the plate that can be removed only by thorough scraping and scouring together with the application of a suitable detergent. Our invention embodies a novel combination preferably adapted to serve this function with great convenience and efficiency.

More specifically our improved grill cleaner includes a housing and a detergent tank disposed above a resilient backing plate carried on the housing. Clamping means is provided on the housing for removably securing a cleaning pad of steel wool or other suitable scouring material to the backing plate and means for automatically dispensing detergent from the tank to the pad as required. An operating handle and pressure-applying knob carried by the housing facilitate the scouring function and a scraper blade also mounted for convenient manipulation on the housing completes the combination. The various parts are furthermore constructed in independent units convenient to manufacture and provide easy assembly and disassembly. The production of a novel grill cleaner of the nature above and hereinafter described comprises the primary object of the invention.

These and other features of the invention will be best understood and appreciated from the following description of a preferred embodiment thereof selected for purposes of illustration and shown in the accompanying drawings in which:

FIG. 1 is a side elevation of a grill cleaner embodying our invention.

FIG. 2 is a sectional view taken on line 2—2 of FIG. 5,

FIG. 3 is a side elevation illustrating the device in grill scraping position,

FIG. 4 is a sectional view taken on line 4—4 of FIG. 5,

FIG. 5 is a plan view of the device with the handle broken away, and

FIG. 6 is a fragmentary bottom plan view.

In the drawing 10 indicates a housing having top and bottom walls 12 and 14 provided with an opening through the top wall for receiving a liquid detergent containing tank 16 disposed within the housing. The top and bottom walls of the housing are rigidly connected by side walls 18, and outwardly and oppositely disposed ribs 20 and 22 are provided on the bottom margin of the housing. The marginal portions of a resilient and perforated backing plate 24 are crimped over the ribs and support the backing plate beneath and in spaced relation from the bottom wall of the housing. The backing plate provides a support for a cleaning or scouring pad 26 of steel wool or other suitable material. The pad is removably secured in place on the backing plate by members 28 pivoted to the side walls of the housing at 30 and having teeth 32 for penetrating and holding the ends of the pad. Coiled springs 34 on the pivot rods 30 hold the members in gripping contact with the pad.

The tank 16 has a centrally disposed opening through its bottom wall normally closed by a valve 36 under the action of an expansion spring 38 on the valve stem. The valve stem passes downwardly and loosely through an opening in the bottom wall 14 of the housing, and is provided with a button 40 on its bottom end adjacent to but spaced from the backing plate.

The housing and backing plate are preferably of rectangular shape and use of the device is facilitated by a handle 42 affixed to one end of the housing and a scraper 44 affixed to the other end in opposed relation to the handle. The handle is mounted on a metal bracket 46 rigidly secured by tap screws 48 or otherwise to one end of the housing and the scraper is likewise secured to the other end. The tank 16 is provided with marginal portions 50 resting on the top wall 12 of the housing and secured thereto by tap screws 52. A closure cap 54 is screw threaded to the filling neck 56 of the tank and this cap embodies a relatively large knob with a broad top surface for purposes hereinafter described.

It is believed that the function and efficiency of our novel grill cleaner will now be apparent. The several parts of the combination are relatively simple and economical to manufacture and assemble. A cleaning or scouring pad of the nature required can be conveniently affixed in cleaning position over the backing plate and can be quickly removed and exchanged. In the cleaning operation the scraper is employed as illustrated in FIG. 3 to remove hard particles from the cooking plate 58 and the further cleaning and scouring of the plate by contact of the cleaning pad 26 therewith is illustrated in FIG. 1. The closure cap knob 54 combines with the device to serve useful functions in both the scraping and cleaning operations. In the scraping operation (FIG. 3) contact of the knob with the surface being scraped automatically maintains the scraper 44 at the most efficient scraping angle and in the cleaning and scouring operation (FIG. 1) such pressure as is necessary is applied to the device through the knob 54, one hand holding the handle 42 and the other hand being in pressure contact with the knob. The valve closure spring 38 is so relatively strong that the valve 36 normally remains closed during the usual scouring action. However when additional detergent is required such pressure is placed on the knob as will react against the button 40 and open the valve. If desired the portion of the backing plate directly beneath the button 40 can be placed against an abutment and pressure then applied on the knob to open the valve. Detergent will thereupon flow from the tank downwardly on the valve stem and through the perforated backing plate onto the cleaning pad. It is also noted that the backing plate and its spaced relation from the tank and the bottom wall 14 serves to insulate the housing and tank from being unduly heated by the scouring contact of the grill cleaner with the cooking plate 58.

Having thus disclosed our invention what we claim as new and desire to secure by Letters Patent is:

1. A grill cleaner comprising in combination, a housing including a tank adapted to contain a liquid, outwardly and oppositely disposed ribs on the bottom margin of the housing, a resilient and perforated sheet backing plate carried on said ribs in spaced relation beneath and resiliently movable toward the tank by upward pressure thereon, means for removably supporting a cleaning pad on the bottom face of the backing plate, the tank having a liquid exit opening through its bottom wall above the backing plate, and means including a valve normally closing the opening and having a portion disposed to be engaged by the backing plate to open the valve when the resilient backing plate is forced a predetermined distance upwardly toward the tank.

2. The grill cleaner defined in claim 1 in which opposite margins of the backing plate are crimped over said ribs and support the backing plate for said upward pressure movement on the housing.

3. The grill cleaner defined in claim 1 in which the tank has a filler opening disposed centrally through its top wall above said liquid exit opening through the bottom wall, and a closure cap for the filler opening embodying a knob with a broad top surface against which hand pressure can be applied to maintain the cleaning pad in pressure scouring contact with a surface being cleaned.

4. A grill cleaner comprising in combination, a housing including spaced top and bottom walls connected together at their margins and providing a chamber therein, the top wall having an opening therethrough into the chamber, a tank for containing a liquid extending downwardly through the opening into the chamber and having a marginal portion resting on the housing and together with the tank forming a closure for said opening, means for removably securing the tank in such position to the housing, a perforated backing plate carried by the housing beneath the tank, means for removably supporting a cleaning pad on the bottom face of the backing plate, and means cooperating with an opening through the bottom wall of the tank and including an opening through the bottom wall of the housing for dispensing liquid from the tank onto the pad.

5. A grill cleaner comprising in combination, a housing including spaced top and bottom walls connected together at their margins and providing a chamber therein, a tank within the chamber for containing a liquid and including a bottom wall disposed above and substantially parallel with the chamber bottom wall, a resilient and perforated backing plate carried by the housing beneath, along and in spaced relation from the bottom wall of the housing, means for removably supporting a cleaning pad on the bottom face of the backing plate, the tank having a liquid exit opening through its bottom wall above the backing plate, and means including a valve normally closing the opening and having a portion extending through the bottom wall of the housing and disposed to be engaged by the backing plate and open the valve when the backing plate is forced a predetermined distance upwardly toward the tank, the bottom wall of the housing having an opening therethrough permitting passage of said liquid to the backing plate and pad.

6. A grill cleaner comprising in combination, a rectangular housing including a tank adapted to contain a liquid, a perforated backing plate carried by the housing beneath the tank, means for removably supporting a cleaning pad on the bottom face of the backing plate, means for dispensing liquid from the tank through the backing plate to the cleaning pad, a handle affixed rigidly to the rear end of the housing and extending rearwardly therefrom, a scraper blade rigidly affixed to the forward end of the housing and extending forwardly therefrom in opposed relation to the handle, and a knob disposed centrally on and extending upwardly from the tank and adapted to support the scraper blade at a predetermined scraping angle when the blade and knob are in contact with a surface to be scraped, the knob providing an area against which hand pressure can be applied to maintain the cleaning pad in pressure scouring contact with said surface.

7. The grill cleaner defined in claim 6 in which the tank has a filler opening disposed centrally through its top wall and wherein said knob comprises a closure cap for the filler opening.

References Cited in the file of this patent

UNITED STATES PATENTS

| | | |
|---|---|---|
| 729,515 | Steele | May 26, 1903 |
| 844,700 | Urban | Feb. 19, 1907 |
| 1,146,718 | Landis | July 13, 1915 |
| 1,217,054 | Pearman | Feb. 20, 1917 |
| 1,321,387 | Mourning | Nov. 11, 1919 |
| 2,275,350 | Cords | Mar. 3, 1942 |
| 2,876,476 | Woods | Mar. 10, 1959 |